United States Patent [19]

Mrozik et al.

[11] 3,821,276

[45] June 28, 1974

[54] 3-CYANOBENZENESULFONAMIDES

[75] Inventors: Helmut H. Mrozik, Matawan;
Richard J. Bochis, East Brunswick, both of N.J.

[73] Assignee: Merck & Co., Inc., Rahway, N.J.

[22] Filed: Jan. 7, 1972

[21] Appl. No.: 216,283

[52] U.S. Cl. ..... 260/465 E, 260/465 D, 260/465 E, 260/465 G, 260/397.7, 424/228, 424/304
[51] Int. Cl. .......................................... C07c 121/52
[58] Field of Search ................. 260/465 E; 424/304

[56] References Cited
UNITED STATES PATENTS
3,367,967   2/1968   Bauer............................. 260/465 X

OTHER PUBLICATIONS

Nakaseko: Chemical Abstracts, Vol. 6, p. 2,068, (1912).

Horii: Chemical Abstracts, Vol. 62, p. 14,573, (1965).

*Primary Examiner*—Lewis Gotts
*Assistant Examiner*—Dolph H. Torrence
*Attorney, Agent, or Firm*—David L. Rose; J. Jerome Behan; John Frederick Gerkens

[57] ABSTRACT

Novel substituted 3-cyanobenzenesulfonamides are useful as agents for the treatment of both mature and immature liver fluke infections. The benzenesulfonamide may be substituted on the sulfonamide nitrogen with loweralkyl, and substituted loweralkyl. The benzene ring is optionally substituted at the 4-position with amino and variously substituted at the 5-position. Compositions containing these compounds for the treatment of mature and inmature liver fluke infections are also disclosed.

6 Claims, No Drawings

3-CYANOBENZENESULFONAMIDES

SUMMARY OF THE INVENTION

This invention relates to novel sulfonamides and methods for their preparation. In particular this invention relates to novel 3-cyanobenzenesulfonamides which are optionally substituted at the 4- and 5-positions and on the sulfonamide nitrogen. These novel compounds have antiparasitic and anthelmintic activity and are particularly active against liver fluke in sheep and cattle.

The novel sulfonamides of this invention are represented by the following structural formula:

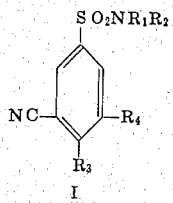

I wherein $R_1$ and $R_2$ may each be hydrogen, loweralkyl, or substituted loweralkyl wherein the substituents are halo, cyano, loweralkoxy, loweralkylthio, loweralkylsulfinyl, or loweralkylsulfonyl; $R_3$ is hydrogen or amino; and $R_4$ is hydrogen, halogen, nitro, or haloloweralkyl.

The terms "loweralkyl" and "loweralkoxy" are intended to include those groups possessing from one to five carbon atoms, either straight or branched chain. Representative examples are methyl, ethyl, propyl, butyl, pentyl, isopropyl, tertiary butyl, methoxy, ethoxy, propoxy, butoxy, pentoxy, sec-butoxy, neo-pentoxy, and the like.

The terms loweralkylthio, loweralkylsulfinyl, and loweralkylsulfonyl, are also intended to include radicals having from one to five carbon atoms in a straight or branched chain configuration.

The term "halo" or "halogen" as used in the instant application inculdes fluorine, chlorine, bromine, or iodine.

The novel compounds are useful as antiparasitic and anthelmintic agents. They are preferentially employed in the treatment of liver fluke in sheep and cattle and when so employed are combined with non-toxic carriers for either oral or parenteral use. These compositions and their method of use in treating liver fluke infestations thus form other aspects of the invention.

PREFERRED EMBODIMENTS OF THE INVENTION

The preferred compounds of this invention are those compounds of formula I where $R_1$ and $R_2$ are hydrogen or loweralkyl, $R_3$ is hydrogen or amino, and $R_4$ is halogen or haloloweralkyl. Compounds exemplary of the preferred embodiments of this invention are the following:

3-Bromo-5-cyanobenzenesulfonamide
4-Amino-3-bromo-5-cyanobenzenesulfonamide
3-Bromo-5-cyano-N-ethylbenzenesulfonamide
4-Amino-3-cyano-5-iodo-N,N-dimethylbenzenesulfonamide
3-Cyano-5-trifluoromethyl-benzenesulfonamide
4-Amino-3-cyano-5-trifluoromethylbenzenesulfonamide
3-Chloro-5-cyanobenzenesulfonamide The compounds of the present invention have utility in the field of animal therapy. They are effective anthelmintics and are especially effective against both mature and immature liver fluke of the species *Fasciola gigantica* and *Fasciola hepatica*, the common liver fluke in sheep and cattle. The preferred dosage levels depend on the type of compound to be employed, the type of animal to be treated, the particular helminth to be combatted, and the severity of the helminthic infestation. In general, effective fluke eradication is achieved when the compounds are administered orally at dosage levels of from about 1 to 300 mg/kg of animal body weight and preferably from about 5 to 100 mg/kg of animal body weight. The compounds of the present invention may be administered in a variety of ways depending upon the particular animal employed, the type of anthelmintic treatment normally given to such animal, the materials employed and the particular helminths being combatted. It is preferred to administer them in anthelmintically effective amounts in a unit oral or parenteral, most preferably oral, dose at a time when fluke infection is apparent or suspected in the animal.

In addition to the inactive ingredients in the composition, said composition may contain one or more other active ingredients which may be selected from the compounds described by formula I or from other known anthelmintic agents. Beneficial results are obtained when the compounds of formula I are combined with an anthelmintic agent such as thiabendazole (2-[4-thiazolyl]benzimidazole), tetramisole (dl-2,3,5,6-tetrahydro-6-phenylimidazo[2,1b]thiazole), Rafoxanide (3,5-diiodo-3'-chloro-4'-[p-chlorophenoxy]-salicylanilide), Parbendazole (5-n-butylbenzimidazo-2-methylcarbamate), and phenothiazine, known anthelmintic agents.

In general, compositions containing the active anthelmintic compound are employed. The amounts of the anthelmintic ingredient in the composition as well as the remaining constituents vary according to the type of treatment to be employed, the host animal and the particular helmintic infestation being treated. In general, however, compositions suitable for oral administration, containing a total weight percent of the active compound or compounds ranging from 0.01 to 95 percent will be suitable with the remainder of the compositions being any suitable carrier or vehicle. A number of modes of treatment may be employed and each to some extent determines the general nature of the composition. For example, the anthelmintic compounds may be administered to domesticated animals in a unit oral dosage form such as a tablet, bolus, capsule, or drench; a liquid oil base form suitable for parenteral administration or they may be compounded as a feed premix to be later admixed with the animals feedstuff. When the compositions are to be solid unit dosage forms as in tablets, capsules or boluses, the ingredients other than the active compounds may be any other non-toxic vehicle convenient in the preparation of such forms and preferably materials nutritionally suitable such as starch, lactose, talc, magnesium stearate, vegetable gums, and the like. Moreover, when capsules are employed, the active compound may be used in essentially undiluted form, the only extraneous material being that of the capsule casing itself which may be hard or soft gelatin or any other acceptable encapsulating material. When the dosage form is to be used for parenteral administration the active material is suitably admixed with an acceptable oil base vehicle preferably of the vegetable oil variety such as peanut oil, cotton seed oil and the like. In all such forms, that is, in tablets, boluses, capsules and oil base formulations, the active compound conveniently ranges from about 5 to 80 percent by weight of the total composition.

When the compounds are used in the form of a drench, the anthelmintic agents may be mixed with or adsorbed on agents which will aid in the subsequent suspending of the active compounds in water such as bentonite, clays, silica, water soluble starches, cellulose derivatives, gums, surface active agents and the like to form a dry pre-drench composition, and this pre-drench composition is added to water just before use. In the pre-drench formulation, in addition to the suspending agent, such ingredients as preservatives, antifoam compounds or other suitable diluents or solvents may be employed. Such a dry product may contain as much as 95 percent by weight of the active compound, the rest being excipient. Preferably, the solid composition contains from 30 to 95 percent by weight of the active compound. Enough water should be added to the solid product to provide the proper dosage level with a convenient amount of liquid for a single oral dose. The commonly used measure in the field is 1 fluid ounce of material and thus 1 fluid ounce of a drench should contain enough of the anthelmintic compound to provide an effective dosage level. Liquid drench formulations containing from 10 to 50 percent by weight of dry ingredients will in general be suitable with a preferred range being from 15 to 25 weight percent.

When the compositions are intended to be used in feeds, feed supplements or feed premixes, they will be mixed with suitable ingredients of the animals nutrient ration. Solid orally ingestible carriers normally used for such purposes such as distillers dried grains, corn meal, citrus meal, fermentation residues, ground oyster shells, attapulgus clay, wheat shorts, molasses solubles, corn cob meal, vegetable substances, toasted dehulled soya flour, soya bean meal feed, antibiotic mycellia, soya grits, crushed limestone and the like are all suitable. The active compounds are intimately dispersed or admixed throughout the active solid carrier by methods such as grinding, melting, or tumbling. By selecting a proper diluent and by altering the ratio of carrier to active ingredient, compositions of any desired concentration may be prepared. Feed supplement formulations containing from about 10 to 30 percent of active ingredient are particularly suitable for addition to feeds. The active compound is normally dispersed or mixed uniformly in the diluent but in some instances may be adsorbed on the carrier.

These supplements are added to the finished animal feed in an amount adequate to give the final concentration desired for controlling or treating the helminth infection by way of animal ration. Although the preferred level in feeds will depend on the particular compounds being employed, the active compounds of this invention are normally fed at levels of 0.01 to 3 percent by weight. As stated above, animals are preferably treated at a time when the infestation is apparent or suspected and the most preferred method of such treatment is with single oral doses. Thus, administration of medicated feed is not preferred but may be employed. Similarly, the amounts of drug present in the feed may be reduced to levels in the order of 0.01 percent to 0.5 percent by weight, based on the weight of the feed and the medicated feed administered over prolonged periods. This could be in the nature of a preventive or prophylactic measure. Another method of aministering the compounds of this invention to animals whose feeds are conveniently pelleted such as sheep is to incorporate them directly into the pellets. For instance, the anthelmintic compounds are readily incorporated in the nutritionally adequate alfafa pellets at levels of 2 to 10 g. per pound for therapeutic use and lower levels for prophylactic use, and such pellets fed to the animals.

Examples of compositions suitable for administration to animals are:

A typical bolus composition is as follows:

| | | |
|---|---|---|
| 3-Bromo-5-cyanobenzenesulfonamide | 1.0 | g. |
| Dicalcium phosphate | 1.0 | g. |
| Starch | 0.7 | g. |
| Guar gum | 0.16 | g. |
| Talc | 0.11 | g. |
| Magnesium stearate | 0.028 | g. |

A typical drench composition is as follows:

| | | |
|---|---|---|
| 4-Amino-3-bromo-5-cyanobenzenesulfonamide | 1.2 | g. |
| Benzalkonium chloride | 0.6 | ml. |
| Antifoam emulsion | 0.06 | g. |
| Hydroxyethyl cellulose | 0.3 | g. |
| Sodium phosphate monobasic | 0.3 | ml. |
| Water | q.s. to 30 | ml. |

Examples of typical feed premix supplements are as follows:

| | | |
|---|---|---|
| 3-Cyano-5-trifluoromethylbenzenesulfonamide | 10 | lbs. |
| Corn meal | 90 | lbs. |
| 3-Chloro-5-cyanobenzenesulfonamide | 20 | lbs. |
| Soybean mill feed | 80 | lbs. |

The above feed premix supplements are combined with the animals regular feed, intimately mixing therewith such that the final concentration of the active ingredient is from 0.01 to 3 percent by weight.

The compounds of the instant invention may be prepared by various processes, some of which are known in the art and which generally culminate with the following reaction:

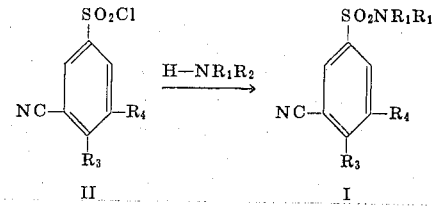

wherein $R_1$, $R_2$, $R_3$, and $R_4$ are as previously defined. The benzenesulfonyl chloride (II) is converted to the benzenesulfonamide (I) by treatment with ammonia or a primary or secondary amine to afford the unsubstituted, N-monosubstituted or N,N-disubstituted benzenesulfonamide, respectively.

The reaction of the benzenesulfonyl chloride with ammonia is usually effected with liquid ammonia although aqueous solutions of ammonia have proven successful. A large molar excess of from 5 to 50 times of ammonia is used at temperatures below the reflux temperature of liquid ammonia. The temperature of dry ice is preferred. When aqueous ammonia is employed, concentrated solutions are preferred of from 20 to 40 percent by weight at a temperature of from 0° C. to room temperature. The benzenesulfonamide is isolated by techniques and procedures known to those skilled in the art.

When the benzenesulfonylchloride is treated with a primary or secondary amine the reaction is preferably run in a solvent at a temperature of from −20° to the reflux temperature of the reaction mixture. Inert solvents may be used which will dissolve both the amine and the benzenesulfonylchloride. Solvents must be chosen, however, that will not react with the sulfonyl chloride. Benzene, methylene chloride, chloroform, tetrahydrofuran, toluene and acetone are examples of satisfactory solvents. During the reaction 1 mole of hydrogen chloride is liberated. It is preferred to add to the reaction medium at least 1 mole of a base which will neutralize the liberated HCl but will not react with the benzenesulfonyl chloride. Tertiary amines such as diethylamine and pyridine are satisfactory. Often the tertiary amine can be used in large excess as the solvent. Another method of effecting the same result is to use an excess of at least one to two molecular equivalents of the primary or secondary amine with or without an inert solvent. An alternative process which may be employed comprises the use of an inorganic base such as an alkali metal carbonate or bicarbonate in combination with one of the above listed inert solvents.

The reaction is generally run for a duration of from 1 to 36 hours depending on the temperature employed, the duration of the reaction being inversely proportional to the temperature. In general, the reaction is complete after stirring at room temperature for about 10 hours.

The intermediate benzenesulfonyl chloride compounds may be prepared by several procedures. A benzene compound unsubstituted at the position where the sulfonamide group is desired may be sulfonated using, for example, fuming sulfuric acid to afford the benzenesulfonic acid which may be converted to the benzenesulfonyl chloride with a chlorinating agent such as phosphorous pentachloride. Chlorosulfonation may be affected in a single step by treating the above benzene derivative with chlorosulfonic acid. The reaction is usually very exothermic and external coaling required to maintain the temperature of the reaction at from 0° to 40° C. The reaction is usually complete in from 1 to 6 hours.

Appropriately substituted aniline derivatives may be used to prepare the desired benzenensulfonylchloride compound by diazotizing the amino group and treating the diazonium salt with cupric chloride and sulfur dioxide. The diazotization step is run in a mineral acid such as hydrochloric, sulfuric, phosphoric, nitric, and the like or mixtures thereof, or organic acids such as acetic acid. Hydrochloric acid is preferred. An alkali metal nitrite is the diazotizing agent with sodium nitrite being preferred. The acidic medium and the alkali metal nitrite can be combined when using sulfuric acid. Nitrosyl sulfuric acid is formed which is reacted directly with the amino compound. The diazotization is run at from −20° to 10° C. to prevent decomposition of the diazonium salt. The salt is then reacted with cupric chloride and sulfur dioxide in an acid medium such as acetic acid affording the sulfonyl chloride derivative.

Where the chlorobenzene precursor is available, in which the chloro substituent is activated by a strongly electron withdrawing group such as nitro in the ortho- or para- positions to the chloro substituent, the thiophenol derivative may be prepared therefrom and this then converted to the sulfonyl chloride derivative. The thiophenol derivative is thus prepared by treating the chlorobenzene derivative with sodium sulfide, and treating the resultant product with chlorine gas in aqueous acetic acid solution.

Certain of the compounds of formula I are prepared using reactions in which the process II → I is not the final step. The loweralkylsulfinylloweralkyl, and loweralkylsulfonylloweralkyl derivatives of the sulfonamide group are prepared by oxidizing the loweralkylthioloweralkyl derivative. Generally oxidizing agents such as m-chloroperbenzoic acid or aqueous hydrogen peroxide are employed in procedures known to those skilled in this art.

The halogenation of the aromatic ring is often accomplished subsequent to the preparation of the sulfonamide or sulfonyl chloride derivative. It has been found that the halogenation, if it is not to interfere with other substituents or reactions, is often preferred to be run as the final step. It is run using a source of molecular halogen as liquid bromine or gaseous chlorine in an inert solvent. In addition other halogenating agents can be employed, such as alkali metal chlorates in an acidic medium, with comparable results. Halogenation can be affected also by employing an amino starting substituent, diazotizing the same and treating the diazonium salt with a metallic halide preferably an alkali metal or cuprous halide. The diazonium salt is prepared as discussed hereinabove.

The benzenesulfonamide group, derived from the benzenesulfonyl chloride and ammonia, can be treated with an alkali metal hydride affording the alkali metal salt of the sulfonamide group. Treatment with a haloalkyl or a substituted haloalkyl compound such as a loweralkyl halide or an alkoxyloweralkyl halide affords the N-alkyl or substituted alkyl derivative of the sulfonamide. Preferred reaction conditions involve the use of sodium hydride to form the sodium salt of the benzenesulfonamide and reacting this with loweralkyl iodide to form the N-loweralkyl compound, or a chloro loweralkylloweralkyl ether to form the N-loweralkoxyloweralkyl derivative. The alkali metal salt is formed at from 10° to 40° usually at room temperature with the alkali metal hydride in suspension in an inert solvent such as dimethylformamide. The halide is reacted with the alkali metal salt at from 0° to 50° C. Initially the reaction is kept at from 0° to 20° C. the reaction being initially exothermic in nature. When the reaction is no longer exothermic the reaction mixture is stirred at from 20° to 50° C. for from 10 minutes to 2 hours.

The trifluoromethyl group is usually present in the initial starting material owing to the stability of the group. The nitro group is introduced by standard nitration reactions usually at an early stage of the synthetic scheme.

The nitro group, by reduction using catalytic and chemical techniques can be converted to the amino group. Catalytic reduction in an inert solvent with a catalyst such as one of the nobel metal catalysts or chemical reduction using a reducing agent such as iron powder are preferred. The reduction can be run at atmospheric pressure or under positive pressure in an atmosphere of hydrogen with comparable results.

In the synthesis of the compounds of formula I it is often necessary to protect certain groups which may be susceptible to attack by the reagents employed in certain of the synthetic steps hereinabove described. In particular the amino group is sensitive to many reagents. It may be protected by preparing the acyl derivative thereof with a carboxylic acid halide or anhydride in a suitable inert solvent. The free amino group can be readily liberated from the acyl derivative using acid or basic catalyzed hydrolysis using techniques known to those skilled in the art. In addition, the amino group can be preserved in the final product by employing starting materials which have a nitro group in the position where an amino group is desired. The nitro group can be reduced to the amino group by catalytic or chemical reduction as discussed hereinabove so long as the reduction process does not interfere with other substituents of the molecule.

The following examples are typical of the procedure employed to synthesize the compounds of this invention. The examples are presented so that the invention might be more fully understood and should not be construed as being limitative of the invention.

EXAMPLE 1

4-Amino-3-cyanobenzenesulfonamide

A. 3-Cyano-4-trifluoroacetamido nitrobenzene 96.4 G. of 3-cyano-4-amino nitrobenzene is dissolved in 295 ml. of pyridine at 10°–20° C. 136.5 G. of trifluoroacetic anhydride is added dropwise producing an exothermic reaction. The reaction mixture is stirred for 1 hour at room temperature and poured into 500 ml. of cold water. The aqueous solution is extracted with chloroform and the chloroform layer washed with 2.5N HCl and water. The chloroform is dried over sodium sulfate and evaporated to dryness affording 148.3 g. of 3-cyano-4-trifluoroacetamido nitrobenzene which is used without further purification in the next step.

B. 3-Cyano-4-trifluoroacetamido aniline 51.8 G. (0.2 moles) of 3-cyano-4-trifluoroacetamido nitrobenzene is dissolved in 900 ml. of methanol and hydrogenated under 40 psi of hydrogen in the presence of 9 g. of 5 percent palladium on carbon at room temperature. The reaction mixture is filtered and the catalyst washed with methanol and the combined methanol washings evaporated to dryness. Petroleum ether is added to the residue and the mixture is filtered. The solid material is washed with ether and dried affording 35 g. of 3-cyano-4-trifluoroacetamido aniline which is used without purification in the next step.

C. 4-Amino-3-cyanobenzenesulfonamide 1.145 G. of 3-cyano-4-trifluoroacetamido aniline is dissolved in 10 ml. of acetic acid and 0.8 ml. of concentrated hydrochloric acid. The solution is cooled to −5° C. and 0.39 g. of sodium nitrite in 1 ml. of water added dropwise over 10 minutes. The solution is stirred for ½ hour and poured into 10 ml. of acetic acid containing 0.1 g. of cupric chloride and excess sulfur dioxide. The reaction mixture is stirred for 1 hour at room temperature and is accompanied by the evolution of gas. The mixture is extracted with chloroform, washed with water, and dried and evaporated to dryness affording 3-cyano-4-trifluoroacetamido benzene sulfonyl chloride. The sulfonyl chloride is added to excess liquid ammonia and the ammonia allowed to evaporate spontaneously. The residue is washed with water, filtered, and dried affording 0.255 g. of 4-amino-3-cyanobenzenesulfonamide, m.p. 196°–200° C. Recrystallization from isopropanol raises the m.p. to 200°–201° C.

EXAMPLE 2

4-Amino-3-bromo-5-cyanobenzenesulfonamide 0.985 G. (0.005 moles) of 3-cyanosulfanilamide is dissolved in 25 ml. of methanol containing 0.334 g. of acetamide. 0.28 Ml. of liquid bromine is added dropwise at room temperature and the reaction mixture stirred for 1 hour during which time a precipitate formed. The precipitate is filtered, washed with methanol, and dried. Recrystallization from isopropanol affords 4-amino-3-bromo-5-cyanobenzenesulfonamide, m.p. 237°–238° C.

EXAMPLE 3

3-Bromo-5-cyanobenzenesulfonamide 2.07 G. (0.0075 moles) of 4-amino-3-bromo-5-cyanobenzenesulfonamide is dissolved in 37.5 ml. of dioxane containing 8 ml. of ethanol and 1.3 ml. of concentrated sulfuric acid. The solution is heated to 70° C. with stirring and 0.655 g. of sodium nitrite in 1.9 ml. of water is added dropwise and is accompanied by the evolution of a gas. The reaction mixture is heated to reflux for 1 hour, cooled, and poured into 100 ml. of water. After standing overnight, the suspension is filtered and the filtrate extracted with ethyl acetate. The ethyl acetate solution is dried and evaporated to dryness and the residue recrystallized from isopropanol affording 1.0 g. of 3-bromo-5-cyanobenzene sulfonamide, m.p. 190°–192° C.

EXAMPLE 4

3-Bromo-5-cyanobenzenesulfonyl chloride

A. 2-Bromo-6-cyano-4-nitroaniline 24.45 G. (0.15 moles) of 2-cyano-4-nitroaniline in 750 ml. of methanol is combined with 10.1 g. of acetamide at room temperature. 8.25 Ml. of liquid bromine is added dropwise and the reaction mixture stirred for 3 hours. The precipitated solid is filtered, washed with cold methanol, and dried affording 17.9 g. of 2-bromo-6-cyano-4-nitroaniline m.p. 188°–190° C.

B. 3-Bromo-5-cyanonitrobenzene

A solution of nitrosyl sulfuric acid is prepared by dissolving 25.05 g. of sodium nitrite in 257 ml. of sulfuric acid at 0° to 5° C. The mixture is warmed to 60° C. in order to completely dissolve the solid material. The solution of nitrosyl sulfuric acid is cooled to 0° to 5° C. with stirring and 79.8 g. (0.33 moles) of 2-bromo-6-cyano-4-nitroaniline is added portionwise. The reaction mixture is stirred for 20 minutes and 257 ml. of 85 percent phosphoric acid added dropwise over 1 hour at 5° to 15° C. The solution is stirred for ½ hour at 10° to 15° C. and a slurry of 30 g. cupric oxide, and 214 g. NaHPO₂ in 130 ml. of water added portionwise at 10° C. The reaction mixture is extracted with three 800 ml. portions of ether and the ether layer dried over magnesium sulfate. The evaporation of the ether affords 67 g. of 3-bromo-5-cyanonitrobenzene m.p. 84°–85.5° C. following distillation and recrystallization from hexane.

C. 3-Bromo-5-cyanoaniline 2.27 G. (0.01 moles) of 3-bromo-5-cyanonitrobenzene is combined with 50 ml. of acetic acid and heated to 100° C. 3.0 G. of iron powder is added portionwise over 20 minutes and the reaction is heated at 100° C. for ½ hour after the addition. The reaction mixture is cooled and poured onto an ice/water mixture and extracted with chloroform. The chloroform is evaporated to dryness affording 1.54 g. of 3-bromo-5-cyanoaniline m.p. 124°–125° C.

D. 3-Bromo-5-cyanobenzenesulfonyl chloride 15.76 G. (0.08 moles) of 3-bromo-5-cyanoaniline and 143 ml. of acetic acid are combined and cooled to 10° C. 13.2 Ml. of concentrated hydrochloric acid is added and the mixture cooled to 0° C. A solution of 6.07 g. of sodium nitrite and 18 ml. of water is added dropwise over 15 minutes and 0° to 5° C. After the addition, the temperature of the reaction mixture is allowed to rise to 10° to 15° C. to allow the solid material to dissolve. Stirring is continued for ½ hour and the reaction mixture filtered and the filtrate poured onto 143 ml. of acetic acid containing 1.43 g. of $CuCl_2$ and saturated with sulfur dioxide at 15° to 20° C. The reaction mixture is stirred for 1 hour and poured into 400 ml. of water and filtered. The solid material is washed with water and dried affording 20.20 g. of 3-bromo-5-cyanobenzenesulfonyl chloride m.p. 83°–86° C.

EXAMPLE 5

3-Bromo-5-cyanobenzenesulfonamide 22.4 G. of 3-bromo-5-cyanobenzenesulfonyl chloride is added portionwise to excess liquid ammonia. Following the addition the excess ammonia is allowed to spontaneously evaporate. Water is added to the solid residue and the suspension filtered and the solid material dried. The residue is recrystallized from hot acetic acid affording 9.9 g. of 3-bromo-5-cyanobenzenesulfonamide m.p. 200°–201° C.

EXAMPLE 6

3-Bromo-5-cyano-N-ethyl-benzenesulfonamide

Ethylamine hydrochloride (0.44 g., 0.005 moles), and 0.01 moles of pyridine are combined in 10 ml. of acetone. The solution is cooled and added to a cooled solution of 1.48 g. (0.005 moles) of 3-bromo-5-cyanobenzenesulfonyl chloride dissolved in 15 ml. of acetone. The reaction mixture is stirred at room temperature for three hours. The reaction mixture is diluted with 5 volumes of water and the resultant precipitate filtered, washed twice with water, dried, and recrystallized from ethanol affording 3-bromo-5-cyano-N-ethyl-benzenesulfonamide.

EXAMPLE 7

3-Bromo-5-cyano-N-propylbenzenesulfonamide 2.8 G. (0.01 moles) of 3-bromo-5-cyanobenzenesulfonamide dissolved in 20 ml. of acetone and added to a solution of 2.36 g. (0.04 moles) of n-propylamine in 20 ml. of acetone at room temperature. A slight exotherm is observed and the reaction mixture stirred overnight at room temperature. 250 Ml. of water is added and the mixture filtered, and the solid material washed with water and dried in air. Following recrystallization from isopropanol there is obtained 1.4 g. of 3-bromo-5-cyano-N-propylbenzenesulfonamide m.p. 96°–99° C.

EXAMPLE 8

3-Bromo-5-cyano-N-methylbenzenesulfonamide

Following the procedure of Example 7 employing 3.1 g. of methyl amine in 20 ml. of acetone there is obtained 1.4 g. of 3-bromo-5-cyano-N-methylbenzenesulfonamide m.p. 110°–112° C. after recrystallization from isopropanol.

EXAMPLE 9

3-Bromo-5-Cyano-N,N-dimethylbenzenesulfonamide

Following the procedure of Example 7 employing 4.5 g. of dimethyl amine in 20 ml. of acetone there is obtained 2.2 g. of 3-bromo-5-cyano-N,N-dimethylbenzenesulfonamide m.p. 104°–106° C. following recrystallization from isopropanol.

EXAMPLE 10

3-Bromo-5-cyano-N-($\beta$-methylthioethyl)-benzenesulfonamide 2.8 G. of 3-bromo-5-cyano-benzenesulfonylchloride is dissolved in 15.0 ml. of acetone. A solution of 2.5 g. of 2-methylthioethylamine dissolved in 15 ml. of acetone is added to the first solution in one portion. A severe exotherm is observed initially and the reaction is stirred at room temperature for 1 hour. The reaction mixture is diluted with water and the solid precipitate is filtered, washed with water, and dried. The residue is recrystallized from ethanol affording 3-bromo-5-cyano-N-($\beta$-methylthioethyl)-benzenesulfonamide, m.p. 74°–76° C.

EXAMPLE 11

3-Bromo-5-cyano-N-($\beta$-methylsulfonylethyl)-benzenesulfonamide m-Chloroperbenzoic acid (0.896 g.) of 86 percent purity is dissolved in 20 ml. of chloroform and added dropwise with stirring to a solution of 0.67 g. of 3-bromo-5-cyano-N-($\beta$-methylthioethyl)-benzenesulfonamide in 30 ml. of chloroform. The reaction mixture is stirred for 2 hours after the addition is complete. The solution is washed once with aqueous saturated sodium bicarbonate and twice with water and dried over magnesium sulfate. The solution is then evaporated in vacuo and the residue recrystallized from ethanol affording 3-bromo-5-cyano-N-($\beta$-methylsulfonylethyl)-benzenesulfonamide.

EXAMPLE 12

3-Bromo-5-cyano-N-($\beta$-methylsulfinylethyl)-benzenesulfonamide m-Chloroperbenzoic acid (0.424 g.) of 85 percent purity is dissolved in 8 ml. of chloroform and added over a 10 minute period to a solution of 0.67 g. (0.002 moles) 3,5-dibromo-N-($\beta$-methylthioethyl)-benzenesulfanamide dissolved in 12 ml. of chloroform. The reaction mixture is stirred at room temperature for 2 hours and the precipitate filtered. The precipitate is washed once with chloroform and dried. The combined filtrates are worked up as in Example 6, and combined with the above precipitate. The residue is recrystallized from ethanol affording 3-bromo-5-cyano-N-($\beta$-methylsulfinylethyl)-benzenesulfonamide, m.p. 166°–168° C.

EXAMPLE 13

3-Bromo-5-cyano-N,N-bis-(methoxymethyl)-benzenesulfonamide

3-Bromo-5-cyanobenzenesulfonamide (2.6 g., 0.01 moles) is dissolved in 15 ml. of dimethyl formamide and 0.468 g. of 54 percent sodium hydride dispersion in mineral oil is added in one portion. Vigorous evolution of hydrogen is observed as the mixture is stirred for 15 minutes at room temperature. The resultant solution is cooled and treated with 0.638 g. of chloromethylmethyl ether in 5 ml. of dimethylformamide dropwise. A precipitate immediately results. The reaction mixture is stirred at room temperature for 1 hour and poured onto 150 ml. of ice water. A milky, turbid suspension results which is stirred for 1 hour at 0° C. The gummy material (starting material) is filtered and the filtrate evaporated to dryness. The residue is washed with ether and the ether solution evaporated to dryness. The residue is recrystallized from ethanol affording 3-bromo-5-cyano-N,N-bis-(methoxymethyl)-benzenesulfonamide.

EXAMPLE 14

4-Amino-3-chloro-5-cyanobenzenesulfonamide 0.985 G. of 4-amino-3-cyanobenzenesulfonamide and 35 ml. of acetic acid are combined and added to 12.5 ml. concentrated hydrochloric acid. The mixture is cooled to 0° C. and 1.96 g. of $NaClO_3$ in 1 ml. of water added dropwise. The reaction mixture is stirred at room temperature for 1 hour, filtered, and the solid material washed with water. The filtrate is evaporated to dryness and a small amount of water is added to the residue. The suspension is filtered and the solid material washed with sodium sulfite solution and water.

There is obtained 0.35 g. of 4-amino-3-chloro-5-cyanobenzenesulfonamide m.p. 219°–220° C. Following recrystallization from ethanol the melting point is raised to 231°–232° C.

EXAMPLE 15

3-Chloro-5-cyano-5-benzenesulfonamide

A solution of nitrosyl sulfuric acid is prepared as in Example 4B using 1.05 g. of sodium nitrite and 10.75 ml. of sulfuric acid. The solution is combined with 3.186 g. (0.0138 moles) of 4-amino-3-chloro-5-cyanobenzenesulfonamide at 0° C. 10.75 Ml. of 85% phosphoric acid is added dropwise. The reaction mixture is stirred for ½ hour. The reaction mixture is combined with 1.25 g. of cupric oxide in 5.4 ml. of a buffer solution, containing 8.95 g. of $NaHPO_2 \cdot 5H_2O$. The solution is stirred for ½ hour, diluted with water and extracted with ethyl acetate. The organic layer is dried and evaporated to dryness affording 1.7 g. of 3-chloro-5-cyano-5-benzenesulfonamide which is chromatographed on silicic acid eluting with chloroform. There is obtained 0.63 g. 3-chloro-5-cyano-5-benzenesulfonamide m.p. 193°–196° C.

EXAMPLE 16

3-Cyano-5-trifluoromethylbenzenesulfonamide

A. 3-Cyano-5-trifluoromethylaniline

A solution of 3.0 g. of 3-cyano-5-trifluoromethyl nitrobenzene is dissolved in 30 ml. of glacial acetic acid and stirred at 100° C. as 3.0 g. of iron powder is added portionwise. The reaction mixture is stirred from 95° to 105° C. for 1 hour following the addition. The reaction mixture is evaporated to dryness and the residue treated with aqueous sodium carbonate. The aqueous solution is extracted with with ethyl acetate and the extracts combined and dried over sodium sulfate and evaporated to dryness affording 2.6 g. of an oil. The oil is chromatographed on 100 g. of silica gel eluting with benzene affording 1.54 g. of 3-cyano-5-trifluoromethylaniline m.p. 64°–67° C.

B. 3-Cyano-5-trifluoromethylbenzenesulfonamide

A solution of 1.45 g. (0.0077 moles) of 3-cyano-5-trifluoromethylaniline in 15 ml. of glacial acetic acid is cooled in an ice bath and treated with 1.3 ml. of concentrated hydrochloric acid. 0.59 G. of sodium nitrite is dissolved in 1.7 ml. of water and added dropwise over 20 minutes at 0° C. The reaction mixture is stirred for 15 minutes at room temperature and poured onto 15 ml. of acetic acid saturated with sulfur dioxide and containing 0.15 g. of cupric chloride. The reaction is exothermic and an ice bath is required to maintain the temperature at 25° C. or less. The reaction mixture is resaturated with sulfur dioxide and stirred for 2 hours at 10° C. The mixture is then poured onto 300 ml. of ice/water affording an oil. The oil is extracted into methylene chloride and the extracts washed with water, dried over sodium sulfate, and evaporated to dryness affording 1.7 g. of 3-cyano-5-trifluoromethylbenzenesulfonyl chloride as an oil. The oil is cooled to −80° C. and treated with 100 ml. of liquid ammonia in 1 portion. The reaction mixture is stirred and the excess ammonia allowed to evaporate. The residue is treated with water containing sufficient acetic acid to insure the acidity of the resultant solution. The precpitate is removed by filtration, washed with water, and dried affording 1.19 g. of solid material which is recrystallized from toluene affording 0.99 g. of 3-cyano-5-trifluoromethylbenzenesulfonamide m.p. 166°–168° C.

EXAMPLE 17

3-Cyano-5-iodobenzenesulfonamide

A. 3-Cyano-5-iodo-nitrobenzene 4.56 G. (0.028 moles) of 3-amino-5-cyanonitrobenzene is combined with 28 ml. of 18% hydrochloric acid and stirred at 0° to 5° C. A solution of 2.125 g. of sodium nitrite in 5.6 ml. of water is added dropwise and the reaction mixture stirred for ½ hour. A solution of 5.11 g. of potassium iodide in 5.6 ml. of water is then added dropwise at room temperature and the reaction mixture stirred at 90° C. for 1 hour. After cooling the reaction mixture is extracted with ether and the ether layer washed with sodium thiosulfate solution, water, sodium bicarbonate solution, and again with water. The ether solution is dried and evaporated to dryness affording 5.6 g. of 3-cyano-5-iodo-nitrobenzene m.p. 85° C.

B. 3-Cyano-5-iodoaniline 2.05 G. (0.0075 moles) of 3-cyano-5-iodonitrobenzene is combined with 37.5 ml. of acetic acid and heated to 100° C. with stirring. 2.25 G. of iron powder is added portionwise and the reaction mixture heated for a further ½ hour. The reaction mixture is cooled and poured onto ice/water and extracted with chloroform. The chloroform layer is washed with sodium bicarbonate solution, dried, and evaporated to dryness affording 1.6 g. of 3-cyano-5-iodoaniline.

C. 3-Cyano-5-iodobenzenesulfonamide

Following the procedure of Example 4D employing 3.69 g. (0.015 moles) of 3-cyano-5-iodoaniline 1.14 g. of sodium nitrite in 3.3 ml. of water, 2.5 ml. of concentrated hydrochloric acid, 37 ml. of acetic acid saturated with sulfur dioxide and containing 0.27 g. of cuprous chloride affords 3-cyano-5-iodobenzenesulfonyl chloride which on treatment with liquid ammonia affords 1.8 g. of 3-cyano-5-iodobenzenesulfonamide m.p. 193°–195° C.

EXAMPLE 18

3-Cyano-5-nitrobenzenesulfonamide

A solution of 3-cyano-5-nitroaniline 8.12 g. (0.05 moles) in 40 ml. of glacial acetic acid is treated at room temperature with 8.1 ml. of concentrated hydrochloric acid. The solution is cooled to form −5° to 0° C. and treated with a solution of 3.50 g. (0.051 moles) of sodium nitrite in 7.0 ml. of water over 10 minutes. The resulting suspension is stirred at 0° C. for 1 hour. This solution is added to a suspension of 50 ml. of glacial acetic acid and 1.0 g. of cupric chloride which is saturated with sulfur dioxide at 0° C. During the addition, gas is evolved from the reaction mixture and when the gas evolution ceases, the reaction mixture is further saturated with sulfur dioxide at room temperature, bubbling the sulfur dioxide into the reaction mixture for approximately 20 minutes. The sulfur dioxide bubbling is stopped and the reaction is stirred at room temperature for 1 hour. The solution is poured onto ice, filtered, and the solid dried affording 9.5 g. of 3-cyano-5-nitrobenzenesulfonylchloride. This is added in portions to 50 ml. of liquid ammonia with stirring. The ammonia is allowed to evaporate, the residue is taken up in benzene, washed with water, dried with MgSO$_4$, filtered and concentrated until crystallization starts. The crystalline 3-cyano-5-nitrobenzenesulfonamide melting at 169°–174° C. is obtained by filtration.

EXAMPLE 19

3-Cyano-5-trifluoromethyl-N-($\beta$-chloroethyl)-benzenesulfonamide

2-Chloroethylamine hydrochloride (0.63 g., 0.005 moles), and (0.01 moles) of pyridine are combined in 10 ml. of acetone. The solution is cooled and added to a cooled solution of 1.3681 (0.005 moles) of 3-cyano-5-trifluoromethyl benzenesulfonyl chloride dissolved in 15 ml. of acetone. The reaction mixture is stirred at room temperature for 3 hours. The reaction mixture is diluted with 5 volumes of water and the resultant precipitate filtered, washed twice with water, dried, and recrystallized from ethanol affording 3-cyano-5-trifluoromethyl-N-($\beta$-chloroethyl)-benzenesulfonamide.

EXAMPLE 20

3-Cyano-5-trifluoromethyl-N-cyanomethylbenzenesulfonamide 3.38 G. (0.022 moles) of amino acetonitrile bisulfate is suspended in 20 ml. of pyridine and the suspension cooled to 0° C. 2.88 G. (0.01 moles) of 3-cyano-5-trifluoromethyl benzenesulfonyl chloride is added thereto portionwise without a solvent. The reaction mixture is stirred at room temperature overnight and poured onto an ice/water mixture. The resulting oil is extracted from the aqueous solution with ether and the ether solution dried over magnesium sulfate, filtered and the filtrate evaporated in vacuo to dryness. The residue is recrystallized from ethanol affording pure, 3-cyano-5-trifluoromethyl-N-cyanomethyl benzenesulfonamide.

EXAMPLE 21

4-Amino-3-bromo-5-cyano-N-methyl benzenesulfonamide

A solution of 3.12 g. (0.01 moles) of 3-cyano-4-trifluoroacetamido benzenesulfonylchloride in 20 ml. of acetone is added to a solution of 3.1 g. (0.04 moles) of 40 percent aqueous methylamine in 20 ml. of acetone at room temperature and stirred for 16 hours. 200 Ml. of water is added, and the precipitate collected by filtration. The intermediate 3-cyano-N-methyl-4-trifluoroacetamidobenzenesulfonamide is refluxed for 1 hour in 30 ml. of 8 percent hydrogen chloride in ethanol. After cooling in ice, 100 ml. of ether are added and the resulting precipitate is collected by filtration. The precipitate is redissolved in the minimum amount of ethanol and 1 ml. of concentrated aqueous ammonia is added, followed by dropwise addition of water until the 4-amino-3-cyano-N-methyl benzenesulfonamide starts to crystallize. It is collected by filtration affording 1.05 g. (.005 moles) of material which is dissolved in 25 ml. of methanol, together with 0.334 g. of acetamide, and 0.28 ml. of elemental bromine is added dropwise. The reaction mixture is stirred at room temperature overnight after which a precipitate forms. The suspension is filtered, washed with water, and aqueous sodium bicarbonate solution affording 4-amino-3-bromo-5-cyanobenzenesulfonamide.

What is claimed is:

1. A compound having the formula:

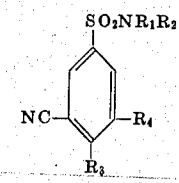

wherein $R_1$ and $R_2$ are each hydrogen, loweralkyl, or substituted loweralkyl wherein the substituents are halo, cyano, loweralkoxy, loweralkylthio, loweralkylsulfinyl, or loweralkylsulfonyl; $R_3$ is hydrogen and $R_4$ is halogen, nitro, or trifluoromethyl.

2. The compound of claim 1 wherein $R_1$ and $R_2$ are hydrogen and $R_4$ is halogen.

3. The compound of claim 2 which is 3-bromo-5-cyano-benzenesulfonamide.

4. The compound of claim 2 which is 3-iodo-5-cyano benzenesulfonamide.

5. The compound of claim 1 which is 3-cyano-5-trifluoromethylbenzenesulfonamide.

6. The compound of claim 1 wherein $R_1$ and $R_2$ are each loweralkylthioloweralkyl, loweralkylsulfinylloweralkyl, or loweralkylsulfonylloweralkyl.

* * * * *